United States Patent Office 3,453,128
Patented July 1, 1969

3,453,128
PREPARATION OF A RUTILE TITANIUM DIOXIDE-ANHYDRITE COMPOSITE PIGMENT
Bernard J. Hoffmann and Lester E. Olmsted, St. Louis, and William Swartz, Affton, Mo., assignors to National Lead Company, New York, N.Y., a corporation of New Jersey
No Drawing. Continuation-in-part of application Ser. No. 517,952, Jan. 3, 1966. This application Apr. 24, 1967, Ser. No. 632,925
Int. Cl. C09c 1/36, 1/02
U.S. Cl. 106—300      6 Claims

ABSTRACT OF THE DISCLOSURE

This invention relates in general to a method for preparing a high quality titanium dioxide-anhydrite composite pigment in which the titanium dioxide is in the rutile crystal form. The process comprises preparing a particular type of titanium hydrate which converts substantially completely to rutile during calcination without adding a titanium-containing rutile promoter as a precalcination treatment.

CROSS-REFERENCE TO RELATED APPLICATION

This application is a continuation-in-part of our application Ser. No. 517,952 filed Jan. 3, 1966, now abandoned.

BACKGROUND OF THE INVENTION

In the prior art methods for making composite pigments containing titanium dioxide and calcium sulfate it is customary to hydrolyze a titanium sulfate solution in the presence of an extender, e.g. calcium sulfate anhydrite, thus forming a coalesced mixture of the titanium hydrate and anhydrite and the mixture is then calcined to form a titanium dioxide-anhydrite composite pigment. In most of these prior art processes small amounts of zinc oxide with and without a titanium-containing rutile converting seed or rutile promoter is added to the hydrate-anhydrite mixture prior to calcination in order to effect conversion of the titanium dioxide values to the rutile form during subsequent calcination to produce the composite pigment.

Although most of the prior art processes for forming a composite pigment containing rutile titanium dioxide pigment employ a titanium-containing rutile converting seed or promoter, in addition to the zinc oxide, one or two methods have been developed which do not require the addition of a titanium-containing rutile promoting or converting seed.

However these particular processes have several distinct disadvantages one of which is that the titanium dioxide must be derived from a particular ore source namely a beach sand type of ilmenite, i.e. a so-called "weathered ilmenite"; or from a titanium slag. Among the ilmenite ore bodies which are classified as "weathered ilmenites" are Quilon from India and the ilmenite beach sands of Australia, Brazil and Florida.

All previous attempts to use other ore sources as for example the so-called "massive type" ores have proven unsatisfactory. These massive type ilmenites include the Tellnes ores from Norway, Allard Lakes ores from Quebec and MacIntyre ilmenite from New York State. Whenever these massive ores have been employed as the raw material for making composite pigments, it has been necessary to use in addition to zinc oxide a rutile promoting or converting seed to form rutile titanium dioxide in the composite pigment. For some unknown reason the titanium values in the massive ores are more difficult to convert to rutile than is the case with weathered ores or slags. Moreover even in those particular processes which employ a weathered ore or slag as the $TiO_2$ source materials the titanium hydrate-anhydrite mixture formed by the hydrolysis procedure used are difficult to settle and filter which makes these processes uneconomical to operate on a commercial scale. In this connection it should be pointed out that it is generally necessary to obtain a settling rate of the hydrolysis mixture of at least 8 cm./hr. for a commercial operation.

In the instant invention, however, the titanium hydrate-anhydrite mixture is formed in such a way that the mixture is fast filtering and upon calcination rutile titanium dioxide is formed without using a titanium-containing rutile promoter as a precalcination treatment.

SUMMARY OF THE INVENTION

The instant invention describes a method for preparing a rutile titanium dioxide-anhydrite pigment which comprises hydrolyzing a titanium sulfate-ferrous sulfate solution in the presence of an anhydrite slurry to form a particular type of a fast filtering hydrate which will form rutile composite pigment upon calcination by adding zinc oxide alone as a precalcination treating agent thereby eliminating the need of employing a titanium-containing rutile promoting agent.

The process comprises adding to an anhydrite slurry a certain critical amount of the titanium sulfate solution to form an initial mixture, heating the initial mixture in a particular manner to cure the mixture then adding the remainder of the titanium sulfate solution to the initial cured mixture and boiling the final mixture to hydrolyze the remainder of the titanium values.

The titanium hydrate-anhydrite mixture obtained is fast filtering and upon calcination converts to rutile without adding a titanium-containing rutile promoter.

DESCRIPTION OF THE PREFERRED EMBODIMENTS

The source material for the titanium values in the titanium sulfate solution is from an ilmenite ore or slag composition. This material is digested in concentrated sulfuric acid to form a solution of titanium sulfate and ferrous sulfate using digestion methods well known in the art. The ilmenite ore may be either of the so-called "weathered-type" or of the "massive type."

In carrying out the process of the instant invention a calcium sulfate aqueous slurry and a titanium sulfate-ferrous sulfate solution are first prepared, the amounts of said slurry and said solution being calculated to produce a composite pigment of a predetermined composition. In this connection the composition of composite pigments of this type comprises, in general, $CaSO_4$ anhydrite and various amounts of $TiO_2$, the latter usually ranging from 25% to 60%, the remainder being $CaSO_4$ anhydrite. The two most common compositions comprise the anhydrite plus about 30% and 50% $TiO_2$ respectively. Initially from 4% to 35% of the titanium solution is admixed with the entire amount of calcium sulfate slurry, the sulfuric acid and $TiO_2$ content of the initial mixture being from 7.5% to 17.0% $H_2SO_4$ and from 0.4% to 4.0% $TiO_2$ on a liquor bases.

It is necessary to adjust the $H_2SO_4$ content of the anhydrite slurry so that the liquor in the anhydrite slurry contains a minimum amount of $H_2SO_4$ in order to obtain rapid settling. When using from 4% to 25% of the titanium solution in the initial mixture the anhydrite slurry should contain from 6% to 11% $H_2SO_4$ as a minimum amount. For amounts of titanium solution above 25%, the minimum amount of $H_2SO_4$ in the anhydrite slurry should be 12% $H_2SO_4$. In both cases the maximum amount of $H_2SO_4$ in the anhydrite slurry should be 17%.

The temperature of the anhydrite slurry and the titanium sulfate solution should be raised so that the initial mixture should fall within the range of from 80° C. to 98° C. This initial mixture is then cured by heating at 80° C. to 98° C. from 10 to 90 minutes. This cured mixture is then admixed with the remainder of the titanium solution and the total heated to boil and boiled to hydrolyze the remainder of the titanium values. The titanium hydrate-anhydrite mixture formed by using this hydrolysis procedure possesses the unusual characteristics of being fast settling, rapid filtering and the titanium hydrate being self converting to rutile upon calcination. These characteristics are developed by the unique hydrolysis method described hereinafter irrespective of the type of ilmenite used as the starting material.

The $CaSO_4$ anhydrite to be used in the production of the $TiO_2$-anhydrite composite pigment of this invention is prepared in any well known manner as, for example by the process described in U.S. Patent No. 2,956,859 and is employed as an aqueous slurry containing from 12% to 32% calcium sulfate anhydrite. The amount of anhydrite slurry to be made up is governed by the amount of titanium sulfate solution to be used in the preparation of a composite pigment having a predetermined $TiO_2$-anhydrite composition.

The titanium sulfate solution to be used is prepared by the sulfuric acid digestion of an ilmenite ore, a procedure which is well-known in the art. The titanium sulfate solution formed will also contain ferrous sulfate which remains in soluble form during the subsequent hydrolysis step and hence can be satisfactorily removed from the composite titanium hydrate-anhydrite hydrolysis mixture during the washing and bleaching steps which follow hydrolysis. Prior to the hydrolysis the titanium sulfate solution employed should contain from 8% to 10% $TiO_2$ and from 15% to 20% $H_2SO_4$, the $H_2SO_4/TiO_2$ weight ratio being from 1.8 to 2.3.

More particularly the titanium hydrate-anhydrite hydrolysis mixture from which the composite titanium dioxide-anhydrite pigment is produced is prepared by first admixing from 4% to 35% of the titanium sulfate solution described above with all of the calcium sulfate anhydrite slurry referred to hereinafter as the initial hydrolysis mixture. The acidity of this mixture should contain from 7.5% to 17% $H_2SO_4$ (free and combined with the titanium) and a $TiO_2$ concentration between 0.4% and 4.0%. To obtain the required acidity sulfuric acid should be added to the slurry prior to the addition of the titanium sulfate solution. The temperature of the anhydrite slurry, prior to the addition of the sulfate solution, may vary from room temperature to 98° C. while the temperature of the titanium sulfate solution may be from 45 to 60° C. However it is necessary that this initial hydrolysis mixture reach a temperature of at least 80° C. but not above 98° C. before proceeding to the curing step in the process.

This initial hydrolysis mixture is held between the temperature of 80° C. and 98° C. for 10 to 90 minutes to cure the mixture before the remaining titanium solution is added to the mixture. After adding the remaining titanium solution to form the final hydrolysis mixture the entire match is heated to boil and boiled for 2 to 5 hours to hydrolyze the remaining titanium values to form a hydrolysis mixture of titanium hydrate and anhydrite. This mixture of titanium hydrate and anhydrite is allowed to settle and is then washed and bleached in the usual manner to remove the iron and other colored impurities after which it is dewatered, treated with 0.2% to 2.0% ZnO on a weight basis and calcined to produce a rutile $TiO_2$-anhydrite composite pigment.

In order to describe more fully the instant invention the following examples are presented:

Example I

In this example a rutile $TiO_2$-anhydrite composite pigment of the composition 30% $TiO_2$ and 70% anhydrite was prepared as follows:

PREPARATION OF THHE TITANIUM SULFATE SOLUTION

In this particular run a massive type of ilmenite ore was used as the source of titanium. MacIntyre ilmenite ore containing 45% $TiO_2$, 38% FeO and 5% $Fe_2O_3$ was ground to 4.5+200 mesh and digested in the usual manner with concentrated sulfuric acid to form a so-called "digestion cake" which was dissolved in weak sulfuric acid. The solution was then treated with scrap iron to reduce the ferric iron values to ferrous sulfate and after clarification the solution had the following analysis:

| | |
|---|---|
| $TiO_2$, percent | 8.2 |
| $FeSO_4$, percent | 19.7 |
| $H_2SO_4$, percent | 18.0 |
| $H_2SO_4/TiO_2$ | 2.2 |
| Specific gravity (50° C.) | 1.537 |

PREPARATION OF THE CALCIUM SULFATE ANHYDRITE SLURRY

Finely divided calcium sulfate anhydrite was prepared according to the method described in U.S. Patent No. 2,956,859, issued Oct. 8, 1960 to Warren Rodgers et al., wherein a minor portion of gypsum was added to 78% $H_2SO_4$ at a temperature of 40° C., at the rate of 0.06 part gypsum per minute for each part of sulfuric acid to form a seed and the remaining glysum being then added to the anhydrite seed at 80° C. and the mixture was heated to boiling to convert all of the gypsum to anhydrite.

The anhydrite was then employed as a slurry for the purpose hereinafter described:

PREPARATION OF COMPOSITE TiO₃ PIGMENT BY HYDROLYSIS OF TITANIUM SULFATE SOLUTION IN THE PRESENCE OF ANHYDRITE 1250 grams of calcium sulfate anhydrite slurry containing 32% solids and 61 grams of $H_2SO_4$ were heated to 50° C. and admixed with 563 grams of water and 105 grams of 96% $H_2SO_4$ to form a diluted slurry containing 10.7% $H_2SO_4$ in the anhydrite liquor. The slurry was heated to 90° C.

211 grams of the titanium sulfate solution comprising 10% of the total sulfate solution to be used, were heated to 50° C. and added to the anhydrite slurry at 90° C. over a period of 7 minutes to form an initial hydrolysis mixture containing in the liquor 11.5% $H_2SO_4$ and 1.0% $TiO_2$. This initial hydrolysis mixture was held at 90° C. for 70 minutes, after which the remaining 90% of the titanium sulfate solution was then added to the initial hydrolysis mixture to form the final hydrolysis mixture which was heated to boiling and boiled for 3 hours to hydrolyze all of the titanium values in the presence of the anhydrite. The titanium hydrate-anhydrite mixture was allowed to stand and was found to have a rapid settling rate of 19 cm./hr. After decanting, washing and bleaching, the titanium hydrate-anhydrite mixture was treated with 0.5% ZnO and was calcined at a rate of 90° C. per hour increase, over a temperature range from 800° C. to 1075° C. to produce a calcined composite pigment which when ground in the usual manner possessed the following properties:

| | |
|---|---|
| Tinting strength | 700 |
| Rutile (percent) | 96 |
| Color brightness | 94.3 |
| Color tone | −8.2 |
| Spectral characteristics | +1.6 |
| $TiO_2$ (percent) | 30.0 |

It should be noted that the titanium dioxide in the composite pigment was present in the rutile crystal form and that it was produced without adding a rutile promoter in addition to the ZnO added to the hydrolysis mixture. In addition it should also be called to attention that the titanium hydrate-anhydrite mixture produced settled rapidly and that no yield seed was required to obtain this desirable property.

The percentage of rutile was determined by X-ray diffraction and the tinting strength was determined by the well-known Reynolds' Tinting Strength Method as described in Physical and Chemical Examination of Paints, Varnishes, Lacquers, and Colors by H. A. Gardner, ninth edition, May 1939, page 37.

The color brightness and tone were determined by the following steps:

COLOR BRIGHTNESS AND TONE OF PIGMENT IN ALKYD VEHICLE

This test determines instrumentally the brightness and tone of the titanium dioxide-calcium sulfate composite pigment in a wet film of alkyd vehicle. The pigment is dispersed in a soya alkyd vehicle and the green, red and blue reflectance values of the wet film are measured. The green reflectance value is taken as a measurement of the brightness of the pigment and the blue minus red reflectance values as a measure of the color tone. The determinations are made on a Colormaster Differential Colimeter manufactured by Manufacturers Engineering and Equipment Corp., Hatboro, Pa.

The pigment was mixed with a soya alkyd resin to form a paste and the paste was applied to the surface of a high reflectance white ceramic panel, the thickness of the paste film being sufficient to eliminate the background color. The green, red and blue reflectance values of the film were read on the Colormaster and the reflectances were recorded as percent reflectance.

The spectral characteristics of the composite pigment were determined as follows:

SPECTRAL CHARACTERISTICS OF PIGMENT IN A PAINT VEHICLE

The pigment was mixed with a soya alkyd vehicle containing carbon black and the mixture was formed into a paste. The ratio of the composite pigment to carbon black present in the paste was 5.0 to 0.06. The paste was then spread onto a lacquered sheet and the wet film was immediately tested in the Colormaster Colorimeter described above. The blue and red reflectance values were obtained. The spectral characteristic of the pigment was measured by comparing the result obtained by subtracting the blue from the red reflectance values and comparing this result with the spectral characteristic of a standard pigment previously determined.

COMPOSITE HYDROLYZATE SETTLING RATE DETERMINATION

A slurry comprising 130 ml. of the freshly prepared titanium hydrate-anhydrite mixture at 15% solids was placed in a 500 ml. graduate cylinder and diluted to a specific gravity of 1.12 and heated to 30° C. The solids in the diluted slurry were allowed to settle. The rate of settling was recorded in cm./hr. by measuring the clear layer that formed at the top of the cylinder.

Further runs were made using the procedure described in Example I except that variations were made in the concentrations and temperatures employed.

These runs are described as follows:

Example II

In this run the procedure of Example I was repeated except that 68 grams of 96% $H_2SO_4$ and 596 grams of water were added to the anhydrite slurry to produce 9.5% $H_2SO_4$ in the initial hydrolysis mixture instead of 11.5% $H_2SO_4$ as obtained in Example I.

As in Example I the final titanium hydrate-anhydrite mixture was found to be a rapid settling slurry, i.e. 18 cm./hr. and was fast filtering. The titanium hydrate-anhydrite mixture upon calcination, produced a composite pigment having the rutile structure. The operational details and pigment properties are recorded in Table I.

Example III

The procedure of Example I was repeated except that no water was added to the calcium sulfate anhydrite slurry which originally contained 31% solids and 61 grams of $H_2SO_4$. 30 grams of 96% $H_2SO_4$ were added so that the initial hydrolysis mixture would contain 11.5% $H_2SO_4$. The $TiO_2$ in the mixture was 1.5% instead of 1.0%. Again a fast settling (i.e. 220 cm./hr.) titanium hydrate-anhydrite mixture was obtained which upon calcination converted to 94% rutile without adding the addition to ZnO a rutile converting agent to the hydrolysis liquor. The operational details and results obtained are recorded in Table I.

Example IV

In this example the procedure of Example II was repeated except that the temperature of the initial hydrolysis was made at 80° C. instead of 90° C. and the initial hydrolysis mixture was held at 80° C. for 90 minutes before adding the remainder of the titanium solution. As shown in Table I, the composite titanium hydrate-anhydrite mixture produced possessed a slightly slower settling rate (10 cm./hr.). Upon calcination, however, the hydrate produced a rutile composite pigment without having to use a rutile converting agent in addition to the ZnO.

Example V

In this example 20% of the total titanium sulfate solution was used in the initial hydrolysis mixture instead of 10% as in Example I. 1915 grams of water and 261 grams of 96% $H_2SO_4$ were added to the 1250 grams of anhydrite slurry which contained 32% solids and 61 grams of $H_2SO_4$. This produced a diluted anhydrite slurry containing 12% solids. To this diluted slurry, heated to 90° C., was added 20% of the total titanium sulfate solution and this initial hydrolysis mixture was held at 90° C. for 70 minutes. The remaining 80% of the titanium sulfate solution was then added, heated to boiling and boiled for 3 hours to produce a titanium hydrate-anhydrite mixture which, when calcined, produced a rutile $TiO_2$-anhydrite composite pigment similar to that produced in Example I.

In the next three examples a different ilmenite source material was used comprising a mixture of ores part of which was in the form of the so-called beach sand type or weathered ilmenite. It contained 49% $TiO_2$, 31% FeO and 9/ $Fe_2O_3$. After being ground, digested and processed in the same manner as that described in Example I, a titanium sulfate solution having substantially the same composition of that described in Example I was obtained.

Example VI 2035 grams of calcium sulfate anhydrite slurry containing 30% solids and 96 grams of $H_2SO_4$ were heated at 80° C. Into this heated slurry were added 127 grams total titanium sulfate to be added) to form the initial hydrolysis mixture containing 0.7% $TiO_2$ and 7.5% $H_2SO_4$ in the mixture. After holding this initial hydrolysis mixture at 90° C. for 70 minutes, the remaining 3051 grams of titanium sulfate solution were added and the final hydrolysis mixture was heated to boil and boiled for 3 hours to precipiate the titanium values. Again the titanium hydrate-anhydrite mixture formed had a satisfactory settling rate of 14 cm./hr. and after treated with ZnO upon calcination produced a rutile titanium dioxide-anhydrite composite pigment without having to use a rutile converting agent. The operational details and results obtained are recorded in Table I.

Example VII

In this example 10% of the titanium solution was used in the initial hydrolysis mixture, and the anhydrite slurry was adjusted so that the concentration of the $TiO_2$ was 1.5% and the $H_2SO_4$ was 11.5% in the initial hydrolysis procedure. Again a titanium hydrate-anhydrite mixture was produced which had a satisfactory settling rate and, upon calcination formed a rutile composite pigment.

Example VIII

In this example 15% of the titanium sulfate solution was used in forming the initial hydrolysis mixture at 90° C. and the anhydrite slurry was adjusted so that the concentration of the $TiO_2$ was 2.1% and the $H_2SO_4$ was 11.5% in the initial hydrolysis mixture. Again a titanium hydrate-anhydrite mixture was produced which, when calcined, formed a rutile titanium dioxide-anhydrite composite pigment, without using a rutile promoting agent in addition to ZnO.

Example IX

In this example 30% of the total amount of titanium sulfate solution required to produce a composite pigment was used to prepare the initial hydrolysis mixture.

319 grams of the titanium sulfate solution prepared in Example I, were added to 718 grams of an anhydrite slurry containing 30% solids and 64 grams of $H_2SO_4$ at 90° C. The concentration of the $TiO_2$ in the initial hydrolysis mixture was 3.3% and the $H_2SO_4$ was 14.2%. After holding the initial hydrolysis mixture at 84° C. for 40 minutes, the remaining 70% of the titanium sulfate solution was added. The final hydrolysis mixture was then heated to boiling and boiled for 2 hours. In this particular example the titanium hydrate-anhydrite mixture produced had a satisfactory settling rate of 12 cm./hr. which is economical to handle on a plant scale. This mixture when treated with ZnO converted to rutile on calcination. The operational details and results obtained are recorded in Table I.

It should be noted that in all of these nine examples a rutile $TiO_2$-anhydrite composite pigment was produced without adding a titanium-containing rutile promoter to the titanium hydrate and that rapid settling of the titanium hydrate-anhydrite mixture was obtained without using a yield seed.

In order to point out more clearly the advantages of using the process of the instant invention, the following examples are presented as controls to show the disadvantages encountered when hydrolysis are made outside the limits specified in the instant invention. The results are recorded in Table II.

Example X

In this example, all of the titanium sulfate solution was included in the initial hydrolysis mixture; and the $TiO_2$ concentration of 5.2% was not adjusted to fall within the range of from 0.4% to 4.0%. As a result, the settling rate of the composite final titanium hydrate-anhydrite mixture was slow, 3 cm./hr. Low rutile conversion, 87% even though ZnO was added and low spectral characteristics, −1.0, were also obtained. These results and other details are recorded in Table II.

Example XI

In this example the procedure of Example I was repeated except that the initial hydrolysis and curing step were carried out at 70° C. instead of within the required temperature range of 80° C. to 98° C. As shown in Table II the settling rate of the titanium hydrate-anhydrite mixture was only 1 cm./hr. which is commercially unsatisfactory. The rutile content of the calcined pigment was also very low even though ZnO had been added as was the spectral characteristics.

TABLE I

| | Example Number | | | | | | | | |
|---|---|---|---|---|---|---|---|---|---|
| | I | II | III | IV | V | VI | VII | VIII | IX |
| Anhydrite slurry: | | | | | | | | | |
| Anhydrite used, grams | 400 | 400 | 400 | 400 | 400 | 610 | 400 | 400 | 216 |
| Water, grams | 1,356 | 1,388 | 827 | 1,387 | 2,715 | 1,329 | 827 | 827 | 438 |
| $H_2SO_4$, grams | 162 | 126 | 90 | 128 | 322 | 96 | 92 | 84 | 64 |
| Solids, percent | 21 | 21 | 30 | 21 | 12 | 30 | 30 | 30 | 30 |
| $H_2SO_4$, percent | 10.7 | 8.3 | 9.8 | 8.4 | 10.6 | 6.8 | 10.0 | 9.2 | 12.8 |
| Initial hydrolysis mixture: | | | | | | | | | |
| Diluted anhydrite slurry, grams | 1,918 | 1,914 | 1,317 | 1,915 | 3,437 | 2,035 | 1,319 | 1,311 | 718 |
| Diluted anhydrite slurry, Temp. ° C | 90 | 90 | 90 | 90 | 90 | 90 | 90 | 90 | 90 |
| Titanium sulfate soln., grams | 211 | 216 | 211 | 215 | 424 | 127 | 211 | 317 | 319 |
| Titanium sulfate soln., Temp. ° C | 50 | 50 | 50 | 50 | 50 | 50 | 50 | 50 | 50 |
| Percent of total titanium sulfate soln., used | 10 | 10 | 10 | 10 | 20 | 4 | 10 | 15 | 30 |
| $TiO_2$, conc. in mixture, percent | 1.0 | 1.0 | 1.5 | 1.0 | 1.0 | 0.7 | 1.5 | 2.1 | 3.3 |
| Temp. during initial hydrolysis, ° C | 90 | 90 | 90 | 80 | 90 | 90 | 90 | 90 | 84 |
| Time of curing initial hydrolysis, min | 70 | 70 | 70 | 90 | 70 | 70 | 70 | 70 | 40 |
| Final hydrolysis liquor: | | | | | | | | | |
| Remaining titanium sulfate soln. used, grams | 1,899 | 1,944 | 1,899 | 1,934 | 1,686 | 3,051 | 1,899 | 1,804 | 744 |
| Titanium sulfate soln., Temp. ° C | 50 | 50 | 50 | 50 | 50 | 50 | 50 | 50 | 50 |
| Final hydrolysis temp. Range, ° C | 103–108 | 103–108 | 103–108 | 103–108 | 103–108 | 103–108 | 103–108 | 103–108 | 103–108 |
| Boiling time, hrs | 3 | 3 | 3 | 3 | 3 | 3 | 3 | 3 | 2 |
| Settling rate, cm./hr | 19 | 18 | 20 | 10 | 14 | 14 | 18 | 12 | 12 |
| Properties of pigment: | | | | | | | | | |
| Rutile, percent | 96 | 99 | 94 | 99 | 97 | 99 | 99 | 91 | 95 |
| Tinting strength | 700 | 675 | 695 | 650 | 690 | 640 | 645 | 700 | 700 |
| Color brightness | 94.3 | 93.8 | 94.4 | 93.5 | 94.6 | 92.8 | 93.6 | | 94.2 |
| Color tone | −8.2 | −9.3 | −8.6 | −9.9 | −8.4 | −9.6 | −9.2 | −9.7 | −8.5 |
| Special characteristics | +1.6 | +0.1 | +0.5 | +0.9 | +1.9 | +1.7 | +2.3 | +0.8 | +0.9 |
| $TiO_2$, percent | 30 | 30 | 30 | 30 | 30 | 30 | 30 | 30 | 30 |

Note.—Calcination at the rate of 90° C. per hour increase for the temperature range 800° C. to 1,075° C.

TABLE II

|  | Example No. I | |
|---|---|---|
|  | X | X |
| Anhydrite Slurry: |  |  |
| Anhydrite used, grams | 400 | 400 |
| Water, grams | 1,072 | 1,218 |
| $H_2SO_4$, grams | 115 | 146 |
| Solids, percent | 25 | 23 |
| $H_2SO_4$, percent | 9.7 | 10.7 |
| Initial hydrolysis mixture: |  |  |
| Diluted anhydrite slurry, grams | 1,587 | 1,766 |
| Diluted anhydrite slurry, Temp.° C | 90 | 90 |
| Titanium sulfate soln., grams | 2,110 | 217 |
| Titanium sulfate soln., Temp. ° C | 50 | 50 |
| Percent of total titanium sulfate soln., used | 100 | 10 |
| $TiO_2$ conc. in mixture, percent | 5.2 | 1.0 |
| $H_2SO_4$, conc. in mixture, percent | 14.8 | 11.5 |
| Temp. during initial hydrolysis, ° C | 90 | 70 |
| Time of curing initial hydrolysis, min | 70 | 70 |
| Remaining titanium sulfate soln. used, grams | 0 | 1,953 |
| Titanium sulfate soln. temp., ° C |  | 50 |
| Final hydrolysis temp. range, ° C | 103–108 | 103–108 |
| Boiling time, hrs | 3 | 3 |
| Settling rate, cm./hr | 3 | 1 |
| Properties of pigment: |  |  |
| Rutile, percent | 87 | 76 |
| Tinting strength | 670 | 640 |
| Color brightness | 94.0 | 93.7 |
| Color tone | −8.6 | −8.2 |
| Spectral characteristic | −1.0 | −0.5 |
| $TiO_2$, percent | 30 | 30 |

Note.—Calcination at the rate of 90° C. per hour increase for the temperature range 800° C. to 1,075° C.

From the above description and by the examples presented, it has clearly been shown that a new and novel type of a titanium hydrate-anhydrite mixture has been produced which is rapid settling and filtering and which converts upon calcination, to a rutile titanium dioxide-calcium sulfate anhydrite composite pigment. This product is prepared by employing a new and novel hydrolysis process which is simple and economical to use on a commercial scale. Moreover the novel process of the instant invention may be employed with any type of ilmenite ore as a source material of the $TiO_2$; and a superior type of composite pigment is obtained. Since the hydrolysis mixture when treated with ZnO is capable of converting to rutile upon calcination, the necessity of separately preparing a rutile promoting agent is completely eliminated.

While this invention has been described and illustrated by the examples shown, it is not intended to be strictly limited thereto, and other variations and modifications may be employed within the scope of the following claims.

We claim:

1. A process for producing a rutile titanium dioxide-calcium sulfate composite pigment which comprises: preparing a titanium sulfate-ferrous sulfate solution from a titaniferous material selected from the group consisting of massive ilmenite, weathered ilmenite and titanium slag, and a calcium sulfate anhydrite aqueous slurry, the titanium concentration in said titanium sulfate-ferrous sulfate solution calculated as titanium dioxide is from 8% to 10% and the concentration of sulfuric acid in said solution is from 15% to 20% with a weight ratio of $H_2SO_4/TiO_2$ being from 1.8 to 2.3, the amounts of said solution and said slurry used in said process being the calculated amount to form a predeterimned composition of a final calcined composite pigment which falls within the range of from 25% to 60% titanium dioxide and the remainder calcium sulfate anhydrite, said slurry containing a solid content of anhydrite from 12% to 32%, heating said slurry to a temperature from 80° C. to 98° C., adding thereto from 4% to 35% of said titanium sulfate-ferrous sulfate solution to form an initial hydrolysis mixture, said anhydrite slurry containing a minimum of from 6% to 11% $H_2SO_4$ when from 4% to 25% of the titanium sulfate solution is initially employed and at least 12% when more than 25% of the initial $H_2SO_4$ solution is employed, the maximum amount of $H_2SO_4$ in said anhydrite slurry being 17%, holding said initial hydrolysis mixture at a temperature from 80° C. to 98° C. for 10 to 90 minutes, adding the remainder of said titanium sulfate-ferrous sulfate solution to said initial hydrolysis mixture thus forming a final hydrolysis mixture, heating said final hydrolysis mixture to boiling and boiling said mixture to hydrolyze, in the presence of said anhydrite, the titanium values from said solution, filtering, washing and bleaching said titanium hydrate-anhydrite mixture formed to remove the ferrous sulfate therefrom and after adding thereto ZnO in amount from 0.2% to 2.0% based on weight of $TiO_2$ but without the addition of a titanium-containing rutile promoting agent, calcining said hydrate-anhydrite mixture at temperature from 800° C. to 1100° C. and grinding the calcined product, thereby producing a rutile titanium dioxide-calcium sulfate anhydrite composite pigment.

2. Process according to claim 1 in which the anhydrite slurry employed contains sufficient sulfuric acid so that the initial hydrolysis mixture will contain from 7.5% to 17% sulfuric acid.

3. Process according to claim 1 in which the concentration of titanium calculated at $TiO_2$ in the initial hydrolysis mixture is from 0.4 to 4.0%.

4. Process according to claim 1 in which the titanium sulfate-ferrous sulfate solution is prepared by digesting in concentrated sulfuric acid an ilmenite ore of the massive ore type.

5. Process according to claim 1 in which the titanium sulfate-ferrous sulfate solution is prepared by digesting in concentrated sulfuric acid an ilmenite ore of the weathered type.

6. In a process for producing a rutile titanium dioxide-calcium sulfate anhydrite composite pigment by hydrolyzing a titanium sulfate-ferrous sulfate solution, prepared from a titaniferous material selected from the group consisting of massive ilmenite, weathered ilmenite and titanium slag, in the presence of a calcium sulfate anhydrite slurry to produce a titanium hydrate-anhydrite mixture which normally requires the addition of a titanium-containing rutile promoting agent in addition to zinc oxide to convert the titanium values to rutile upon calcination, the improvement which comprises employing an improved hydrolysis procedure to produce a titanium hydrate-anhydrite mixture which after adding thereto from 0.2% to 2.0% ZnO and upon calcination produces a rutile titanium dioxide-anhydrite composite pigment without employing a rutile promoting agent, said improved hydrolysis procedure comprising: preparing a titanium sulfate-ferrous sulfate solution and a calcium sulfate anhydrite aqueous slurry, the titanium concentration in said titanium sulfate-ferrous sulfate solution calculated as titanium dioxide is from 8% to 10% and the concentration of sulfuric acid in said solution is from 15% to 20% with a weight ratio of $H_2SO_4/TiO_2$ being from 1.8 to 2.3, the amounts of said solution and said slurry used in said process being the calculated amount to form a predetermined composition of a final calcined composite pigment which falls within the range of from 25% to 60% titanium dioxide and the remainder calcium sulfate anhydrite, said slurry containing a solid content of anhydrite from 12% to 32%, heating said slurry to a temperature from 80° C. to 98° C., adding thereto from 4% to 35% of said titanium sulfate-ferrous sulfate solution to form an initial hydrolysis mixture, said anhydrite slurry containing a minimum of from 6% to 11% $H_2SO_4$ when from 4% to 25% of the titanium sulfate solution is initially employed and at least 12% when more than 25% of the initial $TiSO_4$ solution is employed, the maximum amount of $H_2SO_4$ in said anhydrite slurry being 17%, holding said initial hydrolysis mixture at a temperature from 80° C. to 98° C. for 10 to 90 minutes, adding the remainder of said titanium sulfate-ferrous sulfate solution to said initial hydrolysis mixture thus forming a final hydrolysis mixture, heating said final hydrolysis mixture to boiling and boiling said mixture to hydrolyze, in the presence of said anhydrite, the titanium values from said solution.

References Cited

UNITED STATES PATENTS

| 2,369,468 | 2/1945 | Kingsbury et al. | 106—300 |
| 2,744,028 | 5/1956 | Grave | 106—300 |
| 2,760,880 | 8/1956 | Grave | 106—300 |
| 3,073,711 | 1/1963 | Doll et al. | 106—300 |

TOBIAS E. LEVOW, *Primary Examiner.*

S. E. MOTT, *Assistant Examiner.*

U.S. Cl. X.R.

106—306